UNITED STATES PATENT OFFICE.

GUSTAVE MARSILE, OF LOS ANGELES, CALIFORNIA.

AUTOMOBILE DIRECTION INDICATOR.

1,419,069.  Specification of Letters Patent.  Patented June 6, 1922.

Application filed March 4, 1920. Serial No. 363,111.

*To all whom it may concern:*

Be it known that I, GUSTAVE MARSILE, a citizen of the United States, residing at Los Angeles, in the county of Los Angeles and State of California, have invented new and useful Improvements in Automobile Direction Indicators, of which the following is a specification.

This invention relates to direction indicators for vehicles and particularly automobiles and has for its object to provide a device of this kind that is comparatively simple and that may be readily attached to convenient parts of an automobile structure for the ready indication of the intended control of the vehicle, as for instance, to show a sign indicating "Stop" and indicating right and left-hand turns. Further objects of my invention are to provide a direction indicating device that is entirely devoid of movable parts, thereby eliminating the time, labor and expense ordinarily involved in the repair of similar devices having a number of movable parts, and further, to provide a device that is very compact, capable of being easily and quickly applied to or removed from a vehicle and to provide a construction that can be easily and cheaply manufactured, and which will be very effective in performing its intended functions. The invention consists of the construction, the combination and in details and arrangements of the parts, an embodiment of which invention is illustrated in the accompanying drawings and described and claimed herein.

Figure 1 is a perspective showing in outline a portion of an automobile to which the invention is applied.

Fig. 2 is a section longitudinally through the casing or box of the signal apparatus.

Fig. 3 is a section on line 3—3 of Fig. 2.

The casing 2, as shown in Figs. 1 and 2 in the form of a segment of a circle is supported on a bracket $2^a$ and has an arcuate wall 4 upon the edges of which are placed the windows 3 that may be of glass or other suitable material preferably rendered translucent so that rays of light cannot pass freely through the same from one side to the other and so as also to conceal the signal forming means inside of the box. The windows 3—3 preferably extend over the entire vertical sides of the casing 2.

These signal forming means comprise a series of lamp chambers 5, 6 and 7 that are preferably formed of partition walls 8, constructed of metal or other suitable material, fitting tightly between the windows 3—3, and extending substantially radially from one side of the segmental box, the outer ends of each of the chambers being formed in the shape of arrows or darts as at 9 with the shanks converging as stated to a common point so that when the electric bulbs 10 in the chambers 5, 6 and 7 are selectively energized there will be produced a source of illumination the light of which is readily visible from the front and from the back of the windows 3—3 of the casing, the direction or position of the respective chambers 5, 6 and 7 conforming approximately to the now common manual arm signal system in which when the driver sits at the left-hand side of the car and extends his arm outwardly and upwardly indicates a right-hand turn which would be indicated in the present device by the illumination of the bulb 10 in its respective arrow-shaped chamber 5. By the illumination of the bulb 10 in the horizontal chamber 6 a signal of intention of turn to the left would be given; and by the energization of the bulb 10 in the chamber 7 a stop signal would be rendered, this chamber 7 being shown as inclined downwardly below the horizontal chamber 6.

The several chambers 5, 6 and 7 are suitably secured within the housing or box formed by the wall 4, and the glass or other windows 3—3, are secured in place against them as by a marginal flange 11 secured to the edges of the wall 4 and overlapping the windows 3. The lamps 10 are secured in any suitable form of sockets 10′ extending to and projecting through the rear wall $4^a$, and these lamps are provided with the usual lead wires 12 formed in a cable 14 and leading through a suitable sheathing or covering 15 for supplying electrical energy to the lamps.

Various changes may be made without departing from the spirit of the invention as claimed.

What is claimed is:

In a direction indicator for vehicles, a bracket, a housing carried by said bracket, which housing is provided with translucent front and rear walls, a plurality of partitions arranged within the housing to form a series of elongated arrow shaped chambers which converge at one side of the housing, the upper one of which chambers occupies an upwardly inclined position, the lower chamber occupying a downwardly inclined position and the intermediate chamber occupying a horizontal position, all of said chambers being closed front and rear by the translucent walls of the housing, an electric lamp located within each chamber and the lamp in the lower one of said arrow-shaped chambers being distinctively colored.

In testimony whereof I have signed my name to this specification.

GUSTAVE MARSILE.